United States Patent
Shin et al.

(10) Patent No.: US 7,621,722 B2
(45) Date of Patent: Nov. 24, 2009

(54) ROTOR OF COMPRESSOR

(75) Inventors: Dong-koo Shin, Kyunggi-Do (KR); Yang-hee Cho, Seoul (KR); Cheol-hwan Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 547 days.

(21) Appl. No.: 11/213,276

(22) Filed: Aug. 26, 2005

(65) Prior Publication Data
US 2006/0222528 A1 Oct. 5, 2006

(30) Foreign Application Priority Data
Mar. 30, 2005 (KR) ............... 10-2005-0026609

(51) Int. Cl.
*F04B 39/02* (2006.01)
(52) U.S. Cl. ............... 417/366; 417/902; 310/61
(58) Field of Classification Search ............ 417/902, 417/366–371; 310/55, 58, 61, 90, 162, 166, 310/168, 261
See application file for complete search history.

(56) References Cited

U.S. PATENT DOCUMENTS

| | | | | |
|---|---|---|---|---|
| 2,246,777 A | * | 6/1941 | Bordeaux et al. | 310/86 |
| 3,488,532 A | * | 1/1970 | Anderson et al. | 310/58 |
| 3,801,843 A | * | 4/1974 | Corman et al. | 310/52 |
| 4,257,402 A | * | 3/1981 | Westerman, II | 126/652 |
| 4,311,932 A | * | 1/1982 | Olson | 310/61 |
| 5,460,315 A | * | 10/1995 | Boltz et al. | 228/1.1 |
| RE36,367 E | * | 11/1999 | Nagate et al. | 310/156.54 |
| 6,540,016 B1 | * | 4/2003 | Baldantoni | 165/173 |
| 6,982,506 B1 | * | 1/2006 | Johnsen | 310/61 |
| 2003/0184185 A1 | * | 10/2003 | Yoshino et al. | 310/261 |
| 2004/0050371 A1 | * | 3/2004 | Baz | 123/509 |

* cited by examiner

*Primary Examiner*—Devon C Kramer
*Assistant Examiner*—Dnyanesh Kasture
(74) *Attorney, Agent, or Firm*—Lee, Hong, Degerman, Kang & Waimey

(57) ABSTRACT

A rotor of a compressor includes a stack having a plurality of symmetrical flux barriers and gaseous refrigerant passages formed at sides of the flux barriers, a pair of end covers mounted on the upper and lower sides of the stack, and an oil scattering prevention device installed in the gaseous refrigerant passages and having prevention plates for preventing oil, passing through the gaseous passages, from entering gaps of the stack and from leaking out of the stack the stack due to the centrifugal force.

12 Claims, 4 Drawing Sheets

-- Prior Art --

ROTOR OF COMPRESSOR

CROSS REFERENCE TO RELATED APPLICATIONS

Pursuant to 35 U.S.C. § 119(a), this application claims the benefit of earlier filing date and right of priority to Korean Patent Application No. 10-2005-0026609, filed on Mar. 30, 2005, the content of which is hereby incorporated by reference herein in its entirety.

BACKGROUND OF THE INVENTION

1. Field of the Invention

The present invention relates to a rotor of a compressor, and more particularly, to a rotor of a compressor having an oil leakage prevention device for preventing oil from being leaked to the outside of a stack stacked in the rotor through gaps in the stack.

2. Description of the Related Art

FIG. 1 is a view illustrating a conventional hermetic compressor, the conventional hermetic compressor includes a shell 100 having a suction pipe 101 and a discharge pipe 102, a main frame 200 and a sub-frame 300 respectively fixed to the upper and lower sides of the shell 100, a driving part 400 installed between the main frame 200 and the sub-frame 300, a rotation shaft 500 rotated by the driving part 400, and a compression part 600 installed at the upper sides of the rotation shaft 500 and the main frame 200 to compress introduced gaseous refrigerant.

The driving part 400 includes a rotor 401 mounted around the rotation shaft 500 and a stator 402 surrounding the rotor 401. A rotational magnetic field is generated between the rotor 401 and the stator 402 when electricity is applied, and the rotor 401 rotates due to the rotational magnetic field to rotate the rotation shaft 500.

Arrows depicted in FIG. 1 represent the flow of discharged gaseous refrigerant. As shown in the drawing, the gaseous refrigerant, introduced into the compression part 600 from the outside of the shell 100 through the suction pipe 101, is compressed in the compression part 600 and is discharged, and then passes to the outside of the compression part 600. The discharged gaseous refrigerant flows down through the rotor 401 of the driving part 400, passes the outside of the stator 402, and is discharged to the outside of the shell 100 through the discharge pipe 102.

As described above, the gaseous refrigerant discharged from the compression part 600 passes through the driving part 600, such that the driving part 400 is cooled by the discharged gaseous refrigerant.

FIG. 2 is a partially exploded perspective view illustrating the rotor of a conventional compressor.

As shown in the drawing, the rotor 401 of the conventional compressor includes a stack 403, stacked along the rotation shaft 500, in which a plurality of flux barriers 403a is symmetrically formed and discharged gaseous refrigerant passages 403b are formed at the sides of the flux barriers 403a, and upper and lower end covers 404 installed at the upper and lower sides of the stack 403 and respectively having penetrating holes 404a communicated with the gaseous refrigerant passages 403b.

The stack 403 is manufactured such that silicon-metal discs are vertically stacked along the rotation shaft 500 between the pair of end covers 404 spaced apart from each other in the vertical direction.

In addition, the discharged gaseous refrigerant passages 403b are formed such that gaseous refrigerant, introduced into the gaseous refrigerant passages 403b through penetrating holes 404a of the upper end cover 404, passes through the stack 403 and is discharged through the lower sides of the gaseous refrigerant passages 403b, and serve as passages through which the discharged gaseous refrigerant flows to cool the overheated rotor 401.

According to the conventional compressor, when the rotor 401, fixed to the rotation shaft 500 into which the rotation shaft 500 is inserted, is rotated, oil, contained in the discharged gaseous refrigerant flowing through the gaseous refrigerant passages 403b, is introduced into gaps between the stacked silicon-metal discs of the stack 403 by centrifugal force due to the rotation of the rotor 401 and is leaked toward the outside of the stack 403.

As such, the oil, leaked toward the outside of the stack 403, and along with gaseous refrigerant is discharged out of the shell through the discharge pipe 102 penetrating the shell, causing an excess of oil in the compressor to be discharged from the compressor. Due to the excess discharged oil, oil is not sufficiently supplied, and as a result the reliability of the compressor is deteriorated.

SUMMARY OF THE INVENTION

Therefore, the present invention has been made in view of the above and/or other problems, and it is an object of the present invention to provide a rotor of a compressor for preventing oil mixed with gaseous refrigerant from leaking out of a stack through gaps of the stack.

In accordance with the present invention, the above and other objects can be accomplished by the provision of a rotor of a compressor including a stack formed by stacking a plurality of discs, a pair of end covers mounted on the upper side and the lower side of the stack, an oil leakage prevention device having prevention plates for preventing oil from passing through and leaking out of the stack.

Preferably, the stack includes a plurality of symmetrical flux barriers penetrating the stacked discs, and gaseous refrigerant passages formed at the sides of the symmetrical flux barriers.

The end covers have penetrating holes communicated with the gaseous refrigerant passages.

The rotor of a compressor further includes upper and lower insulation blocks having respective through-holes communicated with the respective penetrating holes, closely contacting the upper and lower sides of the prevention plates, and inserted into the gaseous refrigerant passages.

Preferably, each of the upper insulation blocks comprises supporting steps formed in the lower side thereof to support the upper side ends of the prevention plates, and each of the lower insulation blocks includes supporting steps formed in the upper side thereof to support the lower side ends of the prevention plates.

The prevention plates closely contact the inner walls of the gaseous refrigerant passages near the outer circumference of the stack.

Each of the prevention plates includes elastic fixing jaws formed at side ends of each of the prevention plates and elastically and closely contacting inner walls of the gaseous passages near the center of the stack.

BRIEF DESCRIPTION OF THE DRAWINGS

The object and advantages of the present invention will become apparent and more readily appreciated from the following description of an embodiment, taken in conjunction with the accompanying drawings, in which.

DESCRIPTION OF THE PREFERRED EMBODIMENTS

Hereinafter, a rotor of a compressor according to the preferred embodiment of the present invention will be described in detail with reference to the accompanying drawings.

Figure 1:
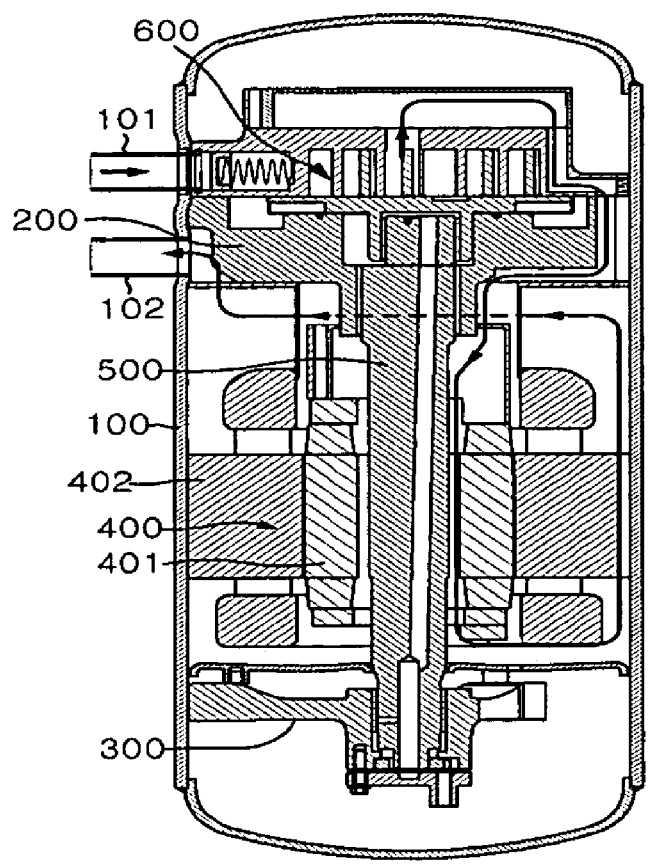
FIG. 1 is a vertical sectional view illustrating a conventional hermetic compressor.
Figure 2:
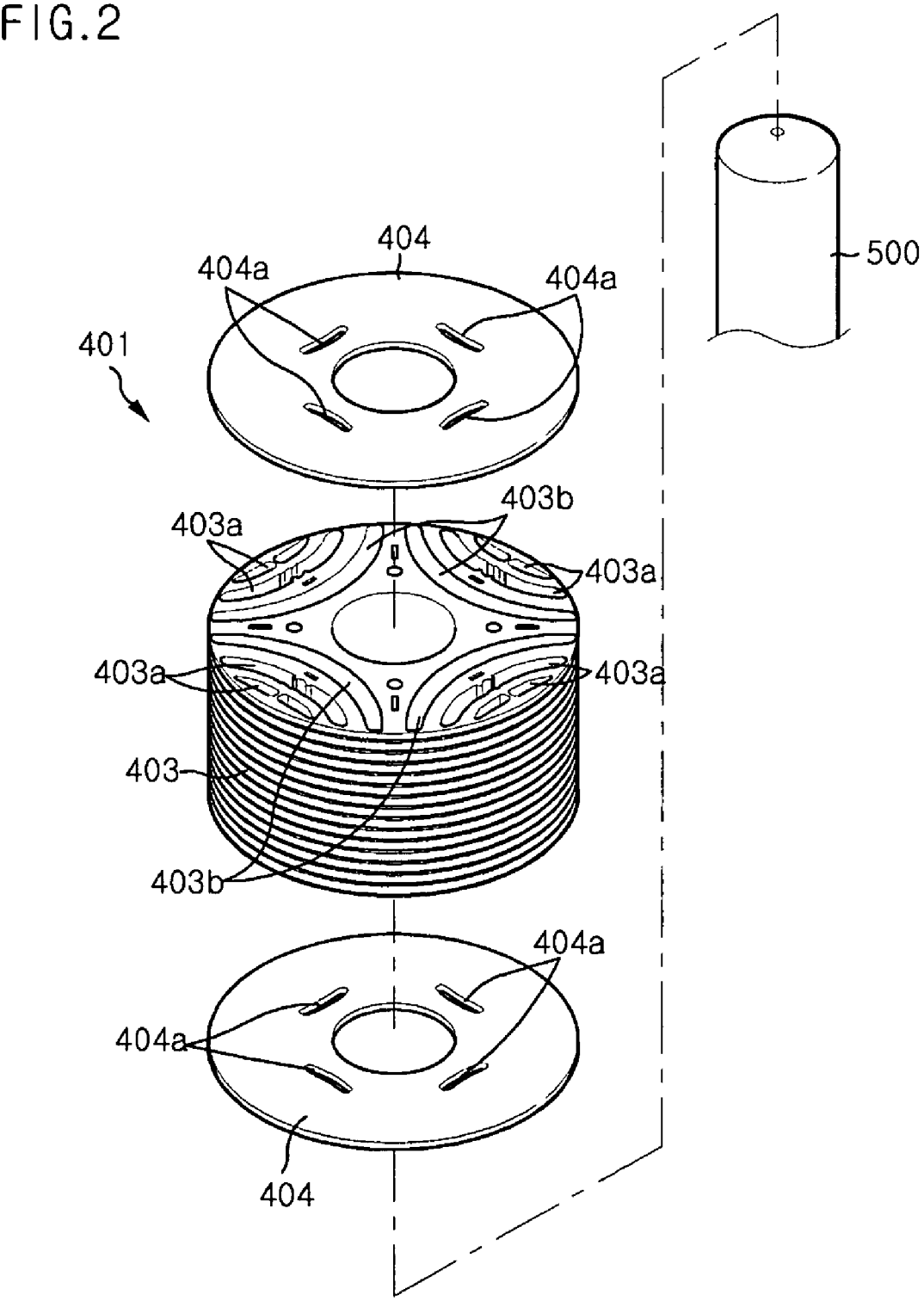
FIG. 2 is a partially exploded perspective view illustrating the rotor of the conventional hermetic compressor.
Figure 3:
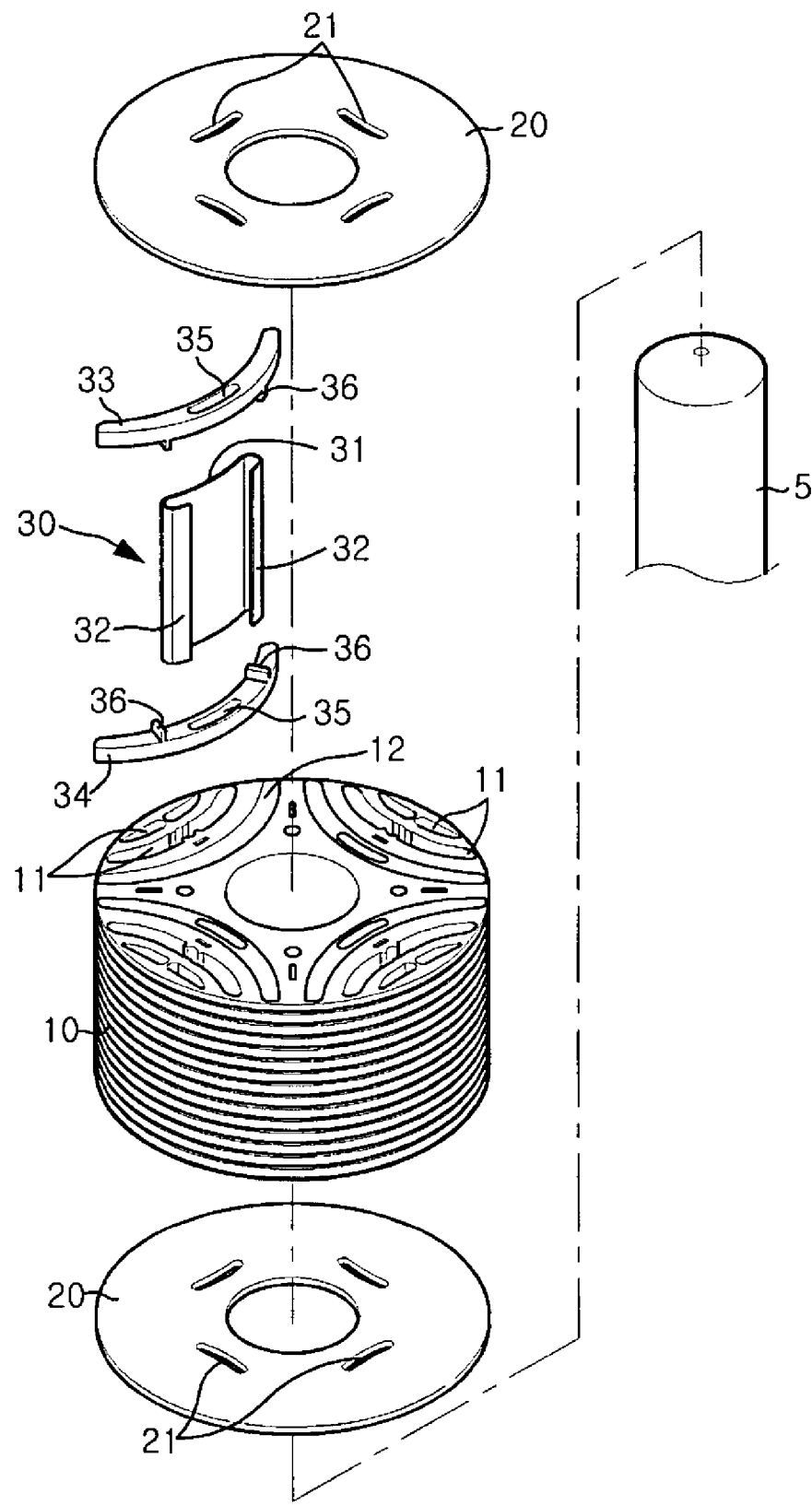
FIG. 3 is a partially exploded perspective view illustrating a rotor of a compressor according to a preferred embodiment of the present invention.
Figure 4:
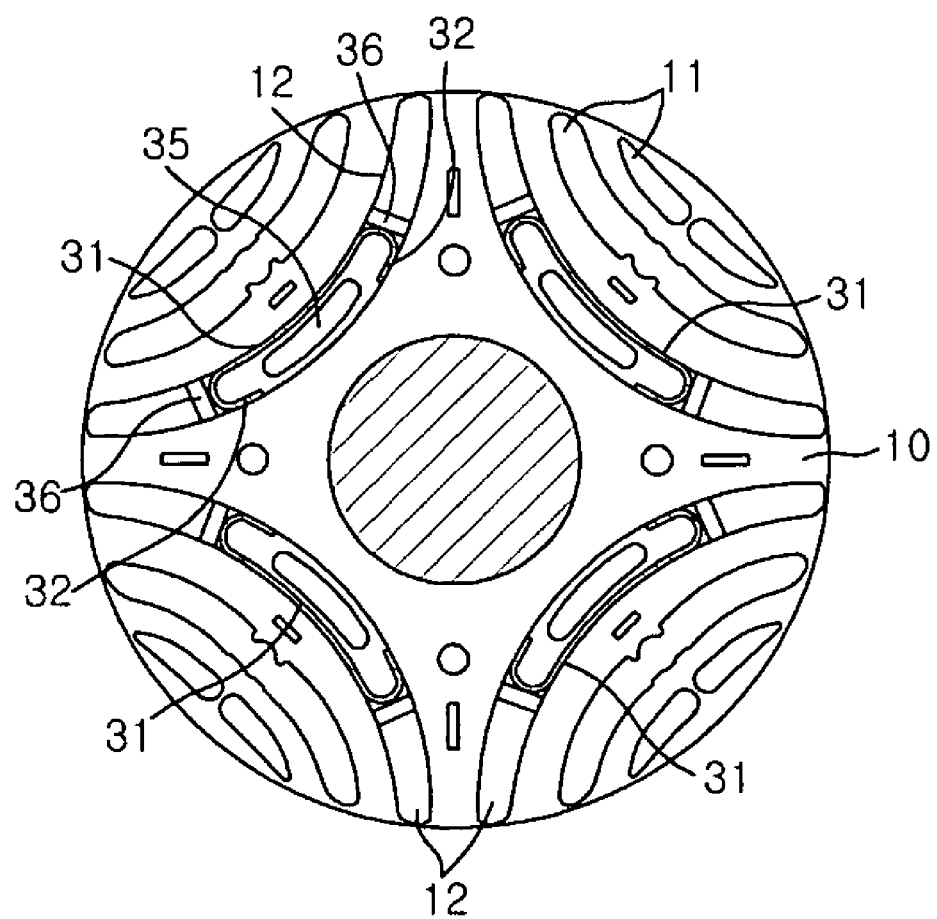
FIG. 4 is a plan sectional side view illustrating the rotor of the compressor according to the preferred embodiment of the present invention.

FIG. 3 is a partially exploded perspective view illustrating the rotor of the compressor according to the preferred embodiment of the present invention, and FIG. 4 is a plan sectional side view illustrating the assembly of the rotor of the compressor according to the preferred embodiment of the present invention.

As shown in the drawings, the rotor 1 of the compressor includes a stack 10, manufactured by stacking a plurality of silicon-metal discs, a pair of end covers 20 installed at the upper and lower sides of the stack 10, and oil leakage prevention devices 30 installed in the stack 10.

The stack 10 includes a plurality of silicon-metal discs stacked along a rotation shaft 5, a plurality of flux barriers 11 penetrating the stacked discs and symmetrically formed therein, and gaseous refrigerant passages 12 formed at the sides of the flux barriers 11 and penetrating the stacked discs.

The flux barriers 11 in conjunction with a stator generate a rotational magnetic field such that the rotor, i.e. the stack 10, is rotated due to the rotational magnetic field.

The gaseous refrigerant passages 12 serve as passages through which the gaseous refrigerant, discharged from a compression chamber after being compressed by the compression chamber, flows, such that the gaseous refrigerant, passing through the gaseous refrigerant passages 12, cools the overheated rotor.

Moreover, the end covers 20 are mounted on the upper and lower sides of the stack 10 to fix the stack 10, and have penetrating holes 21 corresponding to the gaseous refrigerant passages 12, such that the gaseous refrigerant is introduced into the gaseous refrigerant passages 12 through the penetrating holes 21 and discharged from the gaseous refrigerant passages 12.

In addition, each of plural oil leakage prevention devices 30 includes prevention plates 31, closely contacting the inner walls of the gaseous refrigerant passages 12 near the outer circumference of the stack 10, and having elastic fixing jaws 32 formed at either end of the prevention plates 31 and elastically and closely contacting the inner walls of the gaseous refrigerant passages 12 near the center of the stack 10, and upper and lower insulation blocks 33 and 34 respectively closely contacting the upper and lower sides of the prevention plates 31 and having through-holes 35 communicated with the penetrating holes 21 of the end covers 20.

The upper and lower insulation blocks 33 and 34 are respectively formed with a pair of supporting steps 36 to fix the prevention plates 31 by preventing the prevention plates 31 from moving horizontally in the gaseous refrigerant passages 12.

The oil leakage prevention device 30 prevents oil, contained in the discharged gaseous refrigerant passing through the gaseous refrigerant passages 12, from leaking out of the stack 10 through gaps of the stack 10 due to the centrifugal force of the rotor.

In other words, when the oil leakage prevention device 30 blocks passages of gaseous refrigerant containing oil, and flowing from the gaseous refrigerant passages 12 to the outside of the stack 10 through gaps of the stack 10 due to the centrifugal force of the rotor, by means of the prevention plates 31, oil contained in the gaseous refrigerant collides against and is adhered to the prevention plates 31. When the quantity of oil, adhered to the prevention plates 31, is increased, oil flows down from the prevention plates 31 to an oil reservoir formed at the lower side of the shell. Thus, only the gaseous refrigerant is discharged out of the shell through the discharge pipe penetrating the shell.

The elastic fixing jaws 32 are formed by bending the ends of the prevention plates 31 and elastically and closely contact the inner walls of the gaseous refrigerant passages 12 near the center of the stack 10 to elastically fix the prevention plates 31 in the gaseous refrigerant passages 12 by preventing the prevention plates 31 from moving right and left in the gaseous refrigerant passages 12.

When the upper insulation blocks 33 and the lower insulation blocks 34 are made of electrically insulative materials and insulate the upper and lower sides of the stack 10 to prevent malfunction of the rotor due to electrical conduction between the stack 10 and the upper and lower end covers 20.

The through-holes 35 are passages, formed in the upper insulation blocks 33 and the lower insulation blocks 34, through which the gaseous refrigerant enters the gaseous refrigerant passages 12 after passing through the penetrating holes 21. The upper and lower side ends of the prevention plates 31, which closely contact the upper insulation blocks 33 and the lower insulation blocks 34, are inserted between the supporting steps 36, formed in the upper insulation blocks 33 and the lower insulation blocks 34, such that the upper insulation blocks 33 and the lower insulation blocks 34 are fixed to the prevention plates 31, respectively.

As described above, since the rotor of a compressor according to the present invention has a simple structure for preventing oil from leaking through gaps between the stack, the excess discharge of oil due to the oil leakage is sufficiently prevented. Thus, the rotor of a compressor according to the present invention can prevent the quantity of discharged oil and solve the poor reliability of a compressor caused by the excessive oil discharge.

According to the rotor of the present invention, since the prevention plates are conveniently and securely installed in the stack, the rotor is conveniently assembled.

Moreover, the rotor of a compressor according to the present invention prevents electrical conduction between the end covers through the prevention plates such that malfunction of the rotor due to the electrical conduction between the end covers through the prevention plates can be prevented.

Although the preferred embodiment of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A rotor of a compressor comprising:
a stack formed by stacking a plurality of discs;
at least one gaseous refrigerant passage vertically penetrating the stack having an inner wall, said inner wall comprising a portion nearest an outer circumference of the stack and another portion nearest an inner circumference of the stack;

an end cover mounted on the upper side of the stack and another end cover mounted on the lower side of the stack, wherein each end cover comprises penetrating holes aligned with said at least one gaseous refrigerant passage;

an oil leakage prevention device having a prevention plate vertically positioned in the at least one gaseous refrigerant passage for preventing oil from passing through and leaking out of the stack, wherein the prevention plate is in full contact with the portion of the inner wall of the at least one gaseous refrigerant passage nearest the outer circumference of the stack and only partially contacts the portion of the inner wall of the at least one gaseous refrigerant passage nearest the inner circumference of the stack, and wherein the oil leakage prevention device is removable from the at least one gaseous refrigerant passage; and an upper insulation block and a lower insulation block, each comprising a through hole aligned with the corresponding penetrating hole of its respective end cover, the upper and lower insulation blocks being inserted into the at least one gaseous refrigerant passage and respectively contacting the upper and lower sides of the prevention plate via at least two supporting steps formed on the respective upper and lower insulation blocks.

2. The rotor of a compressor as set forth in claim 1, wherein the stack comprises a plurality of symmetrical flux barriers penetrating the stacked discs, and the at least one gaseous refrigerant passage formed at the side of the symmetrical flux barriers.

3. The rotor of a compressor as set forth in claim 1, wherein the at least two supporting steps of the upper insulation block are formed in the lower side thereof to support the upper side end of the prevention plate, and the at least two supporting steps of the lower insulation block are formed in the upper side thereof to support the lower side end of the prevention plate.

4. The rotor of a compressor as set forth in claim 1, wherein the prevention plate comprises elastic fixing jaws formed at side ends of the prevention plate and elastically contacting the portion of the inner wall of the at least one gaseous refrigerant passage nearest the inner circumference of the stack.

5. The rotor of a compressor as set forth in claim 4, wherein the elastic fixing jaws are formed by bending the side ends of the prevention plate.

6. The rotor of a compressor as set forth in claim 1, wherein the discs stacked in the stack are made of silicon-metal.

7. A compressor comprising:
a sealed shell having a suction pipe and a discharge pipe;
a compression part coupled with a rotation shaft to compress gaseous refrigerant introduced into the shell; and
a driving part comprising an oil scattering prevention device including:

a stack having a plurality of discs are stacked around the rotation shaft;

at least one gaseous refrigerant passage vertically penetrating the stack having an inner wall, said inner wall comprising a portion nearest an outer circumference of the stack and another portion nearest an inner circumference of the stack;

an end cover mounted on the upper side of the stack and another end cover mounted on the lower side of the stack, wherein each end cover comprises penetrating holes aligned with said at least one gaseous refrigerant passage:

a prevention plate disposed in the at least one gaseous refrigerant passage for preventing oil from passing through and leaking out of the stack, wherein the prevention plate is in full contact with the portion of the inner wall of the at least one gaseous refrigerant passage nearest the outer circumference of the stack and only partially contacts the portion of the inner wall of the at least one gaseous refrigerant passage nearest the inner circumference of the stack, and wherein the prevention plate is removable from the at least one gaseous refrigerant passage; and an upper insulation block and a lower insulation block, each comprising a through-hole aligned with the corresponding penetrating hole of its respective end cover, the upper and lower insulation blocks being inserted into the at least one gaseous refrigerant passage and respectively contacting the upper and lower sides of the prevention plate via at least two supporting steps formed on the respective upper and lower insulation blocks.

8. The compressor as set forth in claim 7, wherein the stack includes a plurality of symmetrical flux barriers penetrating the stacked discs, and the at least one gaseous refrigerant passage formed at the sides of the symmetrical flux barriers.

9. The refrigerator as set forth in claim 1, wherein the at least two supporting steps of the upper insulation block are formed in the lower side thereof to support the upper side end of the prevention plate, and the at least two supporting steps of the lower insulation block are formed in the upper side thereof to support the lower side end of the prevention plate.

10. The compressor as set forth in claim 7, wherein the prevention plate comprises elastic fixing jaws formed at side ends of the prevention plate and elastically contacting the portion of the inner wall of the at least one gaseous refrigerant passage nearest the inner circumference of the stack.

11. The compressor as set forth in claim 10, wherein the elastic fixing jaws are formed by bending the side ends of the prevention plate.

12. The compressor as set forth in claim 7, wherein the discs stacked in the stack are made of silicon-metal.

* * * * *